(12) United States Patent
Huang

(10) Patent No.: US 10,268,651 B2
(45) Date of Patent: Apr. 23, 2019

(54) METHOD, APPARATUS AND SYSTEM FOR OBTAINING ASSOCIATED WORD INFORMATION

(71) Applicant: TENCENT TECHNOLOGY (SHENZHEN) COMPANY LIMITED, Shenzhen (CN)

(72) Inventor: Fang Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 583 days.

(21) Appl. No.: 14/744,107

(22) Filed: Jun. 19, 2015

(65) Prior Publication Data
US 2015/0286732 A1 Oct. 8, 2015

Related U.S. Application Data

(63) Continuation of application No. PCT/CN2013/089475, filed on Dec. 16, 2013.

(30) Foreign Application Priority Data

Dec. 24, 2012 (CN) .......................... 2012 1 0568142

(51) Int. Cl.
*G06F 17/30* (2006.01)
*G06F 16/9535* (2019.01)
(Continued)

(52) U.S. Cl.
CPC ...... *G06F 16/9535* (2019.01); *G06F 16/2468* (2019.01); *G06F 16/328* (2019.01); *G06F 16/3322* (2019.01)

(58) Field of Classification Search
CPC ......... G06F 17/30867; G06F 17/30542; G06F 17/30631; G06F 17/3064; G06F 16/9535;
(Continued)

(56) References Cited

U.S. PATENT DOCUMENTS 7,581,170 B2 * 8/2009 Baumgartner ...... G06F 16/9535
715/234
8,098,976 B1 * 1/2012 Acharya ............ H04N 21/4756
386/241
(Continued)

FOREIGN PATENT DOCUMENTS

| CN | 101231636 | * | 7/2008 |
| CN | 101231636 A | | 7/2008 |
| CN | 102306171 A | | 1/2012 |

OTHER PUBLICATIONS

International Preliminary Report for Application No. PCT/CN2013/089475 dated Jul. 9, 2015.
(Continued)

*Primary Examiner* — Huawen A Peng
(74) *Attorney, Agent, or Firm* — Anova Law Group, PLLC

(57) ABSTRACT

A method for obtaining associated word information, a searching keyword is obtained. An associated word list corresponding to the searching keyword is obtained, wherein the associated word list comprises one or more associated words containing the searching keyword. For each associated word in the associated word list, a process includes obtaining matching word information corresponding to the associated word, wherein the matching word information comprises text information same as the associated word list and the attribute information; obtaining a displaying template corresponding to the matching word information; generating associated word information to be displayed in a client according to the matching word information and the displaying template.

12 Claims, 6 Drawing Sheets

(51) Int. Cl.
*G06F 16/31* (2019.01)
*G06F 16/2458* (2019.01)
*G06F 16/332* (2019.01)

(58) Field of Classification Search
CPC . G06F 16/2468; G06F 16/3322; G06F 16/328
See application file for complete search history.

(56) References Cited

U.S. PATENT DOCUMENTS

| | | | | |
|---|---|---|---|---|
| 8,375,017 B1* | 2/2013 | Perkins | ............... | G06F 16/951 707/706 |
| 2005/0138022 A1* | 6/2005 | Bailey | ............... | G06F 16/2428 |
| 2007/0100795 A1* | 5/2007 | Davies | ............... | G06Q 30/00 |
| 2007/0156669 A1* | 7/2007 | Marchisio | ............... | G06F 16/951 |
| 2008/0082511 A1* | 4/2008 | Williams | ............... | G06F 17/3064 |
| 2008/0086436 A1* | 4/2008 | Zhao | ............... | G06F 16/3322 706/12 |
| 2008/0133460 A1* | 6/2008 | Clark | ............... | G06F 17/30864 |
| 2009/0254543 A1* | 10/2009 | Ber | ............... | G06F 16/907 |
| 2011/0137921 A1* | 6/2011 | Inagaki | ............... | G06F 16/3347 707/749 |
| 2012/0109978 A1* | 5/2012 | Datta | ............... | G06F 16/3338 707/750 |
| 2012/0330962 A1* | 12/2012 | Huang | ............... | G06F 16/3322 707/740 |
| 2013/0091145 A1* | 4/2013 | Heo | ............... | G06F 16/9535 707/748 |
| 2013/0304818 A1* | 11/2013 | Brumleve | ............... | H04L 67/02 709/204 |

OTHER PUBLICATIONS

International Search Report for International Application No. PCT/CN2013/089475 dated Mar. 20, 2014.

Chinese Office Action for Application No. 2012105681429 dated Dec. 19, 2017, and an English concise explanation of relevance thereof.

Chinese Office Action for Application No. 2012105681429 dated Apr. 26, 2018, and an English concise explanation of relevance thereof.

* cited by examiner

METHOD, APPARATUS AND SYSTEM FOR OBTAINING ASSOCIATED WORD INFORMATION

CROSS-REFERENCE TO RELATED APPLICATIONS

This application is a continuation of International Application No. PCT/CN2013/089475, filed Dec. 16, 2013. This application claims the benefit and priority of Chinese Application No. 201210568142.9, filed Dec. 24, 2012. The entire disclosures of each of the above applications are incorporated herein by reference.

FIELD

The present disclosure relates to a computer network field and to a method and apparatus and system for obtaining associated word information.

BACKGROUND

This section provides background information related to the present disclosure which is not necessarily prior art.

In present technology, the function of searching for associated words is provided for users. In particular, after the users input searching keywords in a searching engine input window, servers can provide the associated words related with the searching keywords to be selected by the users. In particular, all the associated words can be displayed in displaying areas through the manner of drop-down menus.

In present technology, associated words are provided in the displaying areas through drop-down menus. After an associated word is clicked in the displaying area, the associated word clicked is forwarded to the searching engine for searching. During the searching process, the users have to search for text information and a linking address in large amounts of information provided in the searching result webpages.

SUMMARY

This section provides a general summary of the disclosure, and is not a comprehensive disclosure of its full scope or all of its features.

A method, apparatus and system for obtaining associated word information is provided according to various embodiments, so as to improve searching efficiency.

A method for obtaining associated word information includes:
 obtaining, by a server, a searching keyword;
 obtaining, by the server, an associated word list corresponding to the searching keyword, wherein the associated word list comprises one or more associated words containing the searching keyword; and
 performing, by the server, procedures as follows for each associated word in the associated word list:
 obtaining, by the server, matching word information corresponding to the associated word, wherein the matching word information comprises text information same as the associated word list and the attribute information;
 obtaining, by the server, a displaying template corresponding to the matching word information; and
 generating, by the server, associated word information to be displayed in a client according to the matching word information and the displaying template.

An apparatus for obtaining associated word information includes:
 a processor for executing instructions stored in a memory, the instructions comprising:
 a first obtaining instruction, to obtain a searching keyword;
 a second obtaining instruction, to obtain an associated word list corresponding to the searching keyword, wherein the associated word list comprises one or more associated words containing the searching keyword;
 a matching instruction to, for each associated word in the associated word list, obtain matching word information corresponding to the associated word, wherein the matching word information comprises text information the same as the associated word list and the attribute information; and
 a processing instruction, to obtain a displaying template corresponding to the matching word information and generate associated word information to be displayed in a client according to the matching word information and the displaying template.

A system for obtaining associated word information includes a client, to transmit a searching request carrying a searching keyword and a background, establishing a communication relationship with the client, to obtain a searching keyword, obtain an associated word list corresponding to the searching keyword, wherein the associated word list comprises one or more associated words containing the searching keyword. For each associated word in the associated word list, obtaining matching word information corresponding to the associated word, wherein the matching word information comprises text information the same as the associated word list and the attribute information. For each associated word in the associated word list, obtaining a displaying template corresponding to the matching word information. For each associated word in the associated word list, generating associated word information to be displayed in a client according to the matching word information and the displaying template.

It can be seen from the above that a searching keyword is obtained and an associated word list corresponding to the searching keyword is obtained, wherein the associated word list comprises one or more associated words containing the searching keyword. The procedures as follows are performed for each associated word in the associated word list. Obtaining matching word information corresponding to the associated word, wherein the matching word information comprises text information the same as the associated word list and the attribute information; obtaining a displaying template corresponding to the matching word information; generating, by the server, associated word information to be displayed in a client according to the matching word information and the displaying template. Thus, a user does not need to first select an associated word and then obtain a linking address (i.e. a jump address) to be accessed accurately. According to the technical method in the various embodiments, the user can directly obtain the information and the linking address corresponding to the information to be accessed. Thus, a system for obtaining associated information (e.g., accurate information and a linking address) is provided by searching the associated word so as to improve accuracy for obtaining searching results and improve searching efficiency.

Further areas of applicability will become apparent from the description provided herein. The description and examples in this summary are intended for purposes of illustration and are not intended to limit the scope of the present disclosure.

DRAWINGS

The drawings described herein are for illustrative purposes of various embodiments and not all possible implementations, and are not intended to limit the scope of the present disclosure.

Corresponding reference numerals indicate corresponding parts throughout the several views of the drawings.

DETAILED DESCRIPTION

Figure 1:
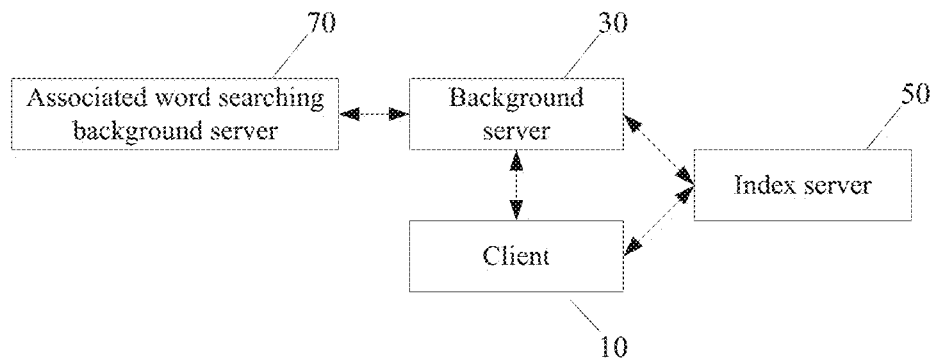
FIG. 1 is a diagram illustrating a structure of system for obtaining associated word information according to various embodiments.

Example embodiments will now be described more fully with reference to the accompanying drawings.

Various embodiments of the present disclosure and technical features in the various embodiments can be combined without conflict. In order to make the object, technical method, and merits of the present disclosure clearer, the present disclosure will be illustrated in detail hereinafter with reference to the accompanying drawings and various embodiments.

A structure of a computer system is illustrated with reference to FIG. 1, which can be used for implementing various embodiments of the present disclosure. In the following description, various embodiments of the present disclosure can be described by signals indicating actions and operations executed by one or more computers. Thus, actions, operations, and processes that the one or more computers execute may include that one or more processors in the one or more computers operate electrical signals of representing data in a structural manner. The data is converted or is maintained in memory of the one or more computers. Thus, operations in a computer are reconfigured or changed in a manner that will be recognized by those skilled in the art. A structure of the data maintained is a physical position in memory having an attribute defined according to a data format. It will be recognized by those skilled in the art that actions and operations according to various embodiments of the present disclosure can be executed by one or more hardware device, e.g., one or more computing device.

In the drawings, the same reference sign refers to the same element. Various embodiments of the present disclosure may be implemented in a computing environment. The following description of various embodiments of the present disclosure cannot be understood as alternative examples to limit the present disclosure.

FIG. 1 is a diagram illustrating a structure of a computer system. The structure of the computer system is an example of an environment and cannot limit a scope and functions of the present disclosure. The computer system cannot be interpreted to imply that any or combination of elements as shown in FIG. 1 are dependent on each other.

Presently, the associated word for the searching keyword is provided for the user and the information for the user is limited during a searching process, and thus, searching efficiency is low.

Figure 2A:
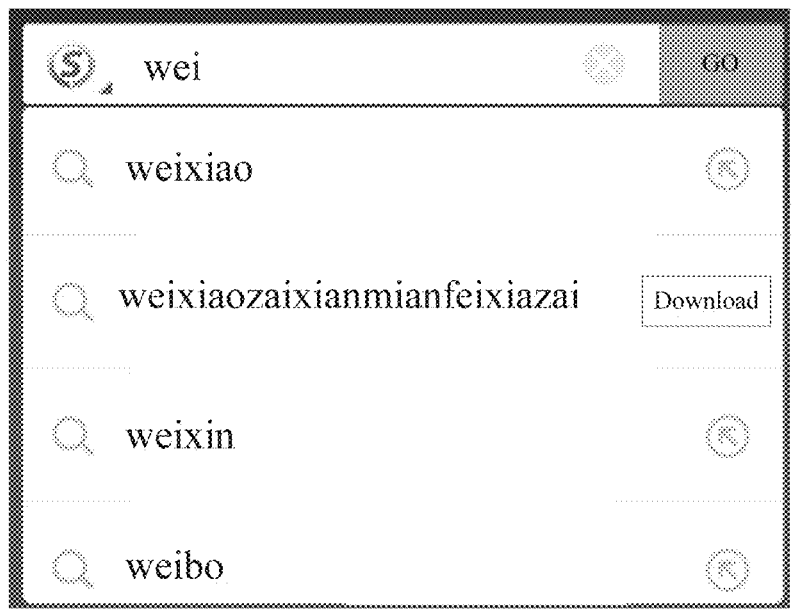
FIG. 2A is a diagram illustrating an application for displaying associated words according to various embodiments.

FIG. 1 is a diagram illustrating a system for obtaining associated word information to various embodiments of the present disclosure. FIG. 2A is a diagram illustrating an application for displaying an associated word in an associated word area.

As shown in FIG. 1, the system for obtaining associated word information includes a client 10 and a background server 30.

According to various embodiments, the client 10 transmits a searching request carrying a searching keyword. The background server 30 that has established a communication relationship with the client 10 obtains the searching keyword and obtains an associated word list corresponding to the searched keyword via a searching engine interface. The associated word list includes one or more associated words containing the searching keyword. For each associated word in the associated word list, the client 10 or the background server 30 obtain matching word information corresponding to the associated word. The matching word information at least includes the associated word. After a displaying template corresponding to the matching word information is obtained, the client 10 or the background server 30 combine the matching word information with the displaying template to generate associated word information displayed in an associated word area. The associated word information includes a displaying text and a jump address corresponding to the displaying text.

According to various embodiments, on the basis of obtaining the one or more associated words which correspond to the searching keyword and are displayed in the associated word area, for each associated word of the one or more associated words, the background server 30 or the client 10 further obtain the matching word information corresponding to the associated word to generate the displaying text and the jump address (i.e., a linking address) displayed in the associated word area. Thus, a user does not need to first select an associated word and then obtain a linking address (i.e. a jump address) to be accessed accurately. According to the technical method according to various embodiments, the user can directly obtain the information and the linking address corresponding to the information to be accessed. Thus, a system for obtaining associated information (e.g., accurate information and a linking address) is provided by searching the associated word so as to improve accuracy for obtaining searching results and improve searching efficiency.

According to various embodiments, an index word list is obtained through preset association relationships of an associated word and matching word information. The index list includes an associated word and one or more pieces of matching word information corresponding to the associated word. The matching word information includes text information and information of a jump address displayed in the associated word area. After a piece of the matching word information is added into a corresponding displaying template, precise searching information may be obtained in the associated word area of the client 10 by the user, so as to improve user's searching efficiency. After the associated word is obtained, the user can click a linking address (e.g. URL) in text information displayed in a drop-down list in the associated word area. A corresponding website is then opened. The background server 30 may obtain the one or more associated words by transmitting a webpage address (i.e., URL) to a searching engine in the searching request and obtaining the associated word list including the one or more associated words corresponding to the searching keyword.

According to various embodiments, as shown in FIG. 2A, when a user inputs a searching keyword "wei" in Chinese, the associated words "weixiao", "weixin" and "weibo" in Chinese in the associated word list are displayed in the associated word area, displaying text "weixinzaixianmianfeixiazai" and a link of the jump address corresponding to the displaying text are displayed in the associated word area. According to various embodiments, as shown in FIG. 2A, the jump address may be obtained by clicking a "download" button. The user may obtain the jump address by clicking the "download" button for accessing the jump address (i.e., network address URL), so as to directly perform downloading on line. According to various embodiments, the user also enters a webpage (e.g. a searching webpage) by clicking the displaying text "weixinzaixianmianfeixiazai" in the area.

According to various embodiments of the present disclosure, the associated word area may be an area for displaying all associated words in the associated word list and associated word information. The direct area may be an area for displaying the associated word information. The direct area may be displayed in in the associated word area. According to various embodiments, the direct area may be displayed on the top area of the associated word area. The associated word area may be displayed through the manner of a drop-down menu.

According to various embodiments, the information displayed in the direct area includes one or more of the following content, the searching keyword, displaying text, a jump address, and/or a direct area type. The searching keyword has an actual matching relationship with the word input by the user into the searching engine (e.g., "wei" in FIG. 2A). The displaying text matches with the searching keyword and is illustrated for the user in the associated word area (e.g., "weixiaozaixianmianfeixiazai" as shown in FIG. 2A). The jump address may be a webpage address to be opened (e,g, a downloading address obtained after the "downloading" button is clicked. The downloading address is jumped to when the "downloading" button is clicked in FIG. 2A). The direct area type may be a type of a webpage corresponding to the jumping address. According to various embodiments, the direct area type is a type of a function of the webpage provided for the user. The direct area type may be classified into novels, high-quality readings, downloading videos, and so on. Furthermore, the direct area may support an expanding type (e.g., the type "downloading" displayed on the button in FIG. 2A indicates that the webpage jumped to may provide a downloading function for the user)

Figure 3:
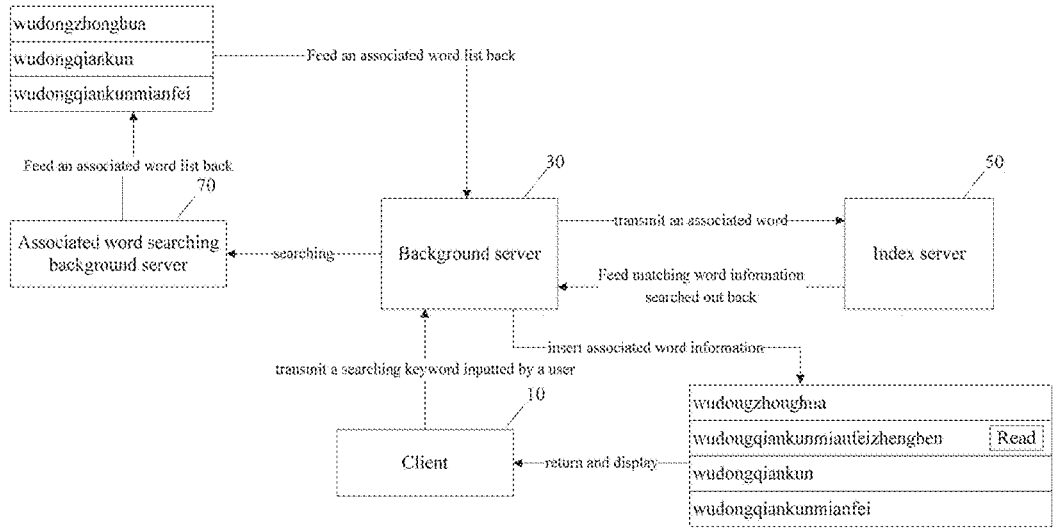
FIG. 3 is a diagram illustrating a structure of a system for obtaining associated word information according to various embodiments.

FIG. 3 is a diagram illustrating a system for obtaining associated word information according to various embodiments of the present disclosure. As shown in FIG. 3, the system further includes an index server 50 on the basis of the system provided according to various embodiments of the present disclosure.

The index server 50 establishes a communication relationship with a background server 30 (e.g., a cloud terminal at a background). After obtaining an associated word from the background server 30, the index server 50 obtains matching word information corresponding to the associated word through a searching operation and transmits the obtained matching word information of the associated word to the background server 30. The matching word information includes text information that is the same as the associated word and attribute information of the text information, e.g., a template attribute value, a jump address. According to various embodiments, the index server 50 has pre-established and saved various associated words and pieces of matching word information that respectively correspond to the various associated words in a database or a data list. According to various embodiments, the index server 50 searches for the matching information the text information of which is the same as the associated word in the matching information stored in the index server 50, configures the matching information corresponding to the associated word with the matching information the text information of which is the same as the associated word when the matching information the text information of which is the same as the associated word is searched out.

The index server 50 searches out a displaying template for the matching word information according to a template attribute value in the attribute information corresponding to the matching word information. Content of the displaying template includes a field text including one or more text of one or more fields in the displaying template. According to various embodiments, the index server 50 searches for a displaying template satisfying the field text in the displaying template, contains a text corresponding to the template attribute value in displaying templates stored in the index server 50, and configures the displaying template corresponding to the matching word information with the searched out displaying template when the displaying template satisfying that field text in the displaying template contains a text corresponding to the template attribute value is searched out.

A searching keyword "wudong" in Chinese, an associated word "wudongqiankun" in Chinese, matching word information including "wudongqiankunmianfeizhengben" in Chinese, and a jump address are taken as examples to describe a technical method according to various embodiments.

Figure 4:
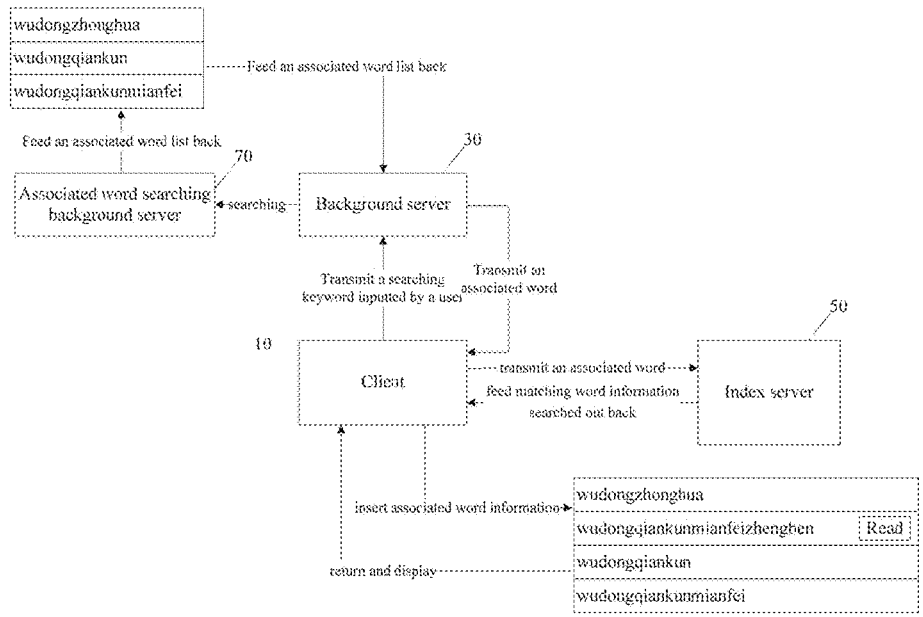
FIG. 4 is a diagram illustrating a structure of a system for obtaining associated word information according to various embodiments.

In various embodiments, the user inputs the searching keyword "wudong" in Chinese through a searching engine window provided in a client 10. The client 10 transmits a searching request carrying the searching keyword to the background 30. After receiving the searching request, the background 30 obtains an associated word list corresponding to the searching keyword "wudong" by performing a searching operation through accessing a searching engine interface of an associated word searching background server 70 (e.g., a server provided by Baidu, or Sousou). The associated word list includes one or more associated words corresponding to the searching keyword, e.g. "wudongzhonghua", "wudongqiankun", "wudongqiankunmianfei" as shown in FIG. 4. The associated word searching background server 70 transmits the associated word list obtained to the background server 30. The background server 30 transmits the one or more associated words in the associated word list to the index server 50. The index server 50 respectively compares the one or more associated word in the associated list with information in a database to determine whether the database includes matching word information respectively matching the one or more associated words. The index server 50 transmits the matching word information that respectively corresponds to the one or more associated words to the background server 30 when the database includes the matching word information respectively matching the one or more associated words. According to various embodiments, the matching word information corresponding to the associated word "wudongqiankun" in Chinese includes the text information "wudongqiankun" in Chinese and attribute information, wherein the attribute information includes "mianfei", "zhengben" in Chinese and a jumping address corresponding to the text information (e.g., an address linked to a reading button). The index server 50 searches out a displaying template according to the template attribute values "mianfei", "zhengben" in Chinese in the attribute information. Content of the displaying template may include a field or a combination of fields. According to various embodiments, the content of the displaying template for the matching word information may at least include the fields "mianfei" and "zhengben".

FIG. 4 is a diagram illustrating a system for obtaining associated word information according to various embodiments of the present disclosure. As shown in FIG. 4, the system further includes an index server 50 on the basis of the system provided according to various embodiments of the present disclosure. The index server 50 establishes a communication relationship with a client 10. The index server 50 obtains an associated word from the client 10, obtains the matching word information corresponding to the associated word by performing a searching operation according to the associated word, and transmits the matching word information corresponding to the associated word to the client 10 or a background server 30, wherein the matching word information includes text information that is the same as the associated word and attribute information of the text information, e.g., a template attribute value, a jump address. According to various embodiments, the index server 50 searches for the matching information the text information of which is the same as the associated word in the matching information stored in the index server 50, configures the matching information corresponding to the associated word with the matching information the text information of which is the same as the associated word when the matching information the text information of which is the same as the associated word is searched out.

The index server 50 searches out a displaying template for the matching word information according to a template attribute value in the attribute information corresponding to the matching word information. Content of the displaying template includes a field text including one or more text of one or more fields in the displaying template. According to various embodiments, the index server 50 searches for a displaying template satisfying that field text in the displaying template contains a text corresponding to the template attribute value in displaying templates stored in the index server 50, configures the displaying template corresponding to the matching word information with the searched out displaying template when the displaying template satisfying that field text in the displaying template contains a text corresponding to the template attribute value is searched out.

A searching keyword "wudong" in Chinese, an associated word "wudongqiankun" in Chinese, matching word information including "wudongqiankunmianfeizhengben" in Chinese, and a jump address are taken as examples to describe a technical method according to various embodiments.

Figure 5:
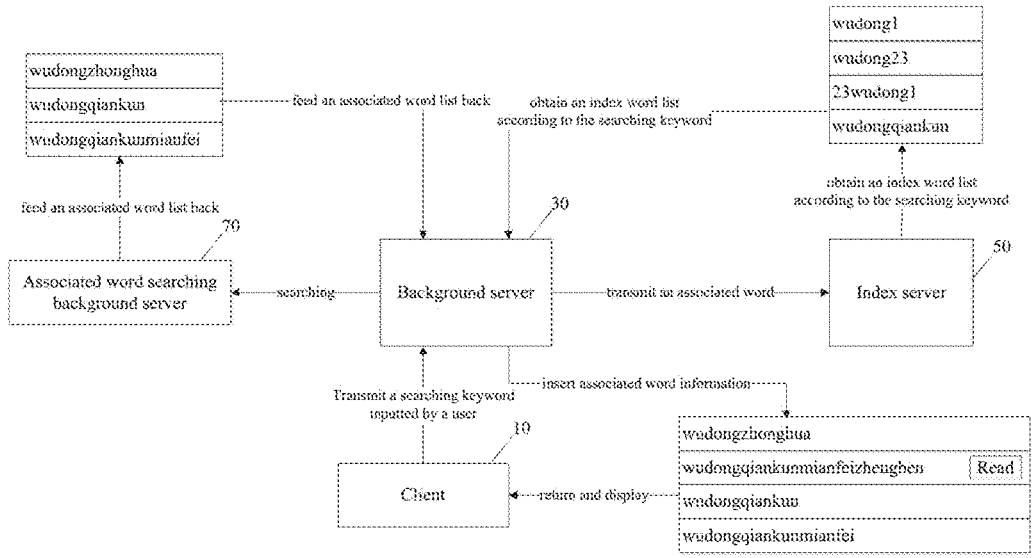
FIG. 5 is a diagram illustrating a structure of a system for obtaining associated word information according to various embodiments.

In various embodiments, the user inputs the searching keyword "wudong" in Chinese via a searching engine window provided in a client 10. The client 10 transmits a searching request carrying the searching keyword to the background 30. After receiving the searching request, the background 30 obtains an associated word list corresponding to the searching keyword "wudong" in Chinese by performing a searching operation through accessing a searching engine interface of an associated word searching background server 70 (e.g., a server provided by Baidu or Sousou). The associated word list includes one or more associated words for the searching keyword, e.g, "wudongzhonghua", "wudongqiankun", "wudongqiankunmianfei" in Chinese as shown in FIG. 5. The associated word searching background server 70 transmits the obtained associated word list to the background server 30. The background server 30 transmits the one or more associated words in the associated word list back to the client 10. The client 10 transmits the one or more associated words to the index server 50. The index server 50 may respectively compare the one or more associated words in the associated list with information in a database to determine whether the database includes matching word information respectively matching the one or more associated words. The index server 50 transmits the matching word information respectively matching the one or more associated words to the background of the client 10 when the database includes the matching word information respectively matching the one or more associated words. According to various embodiments, the matching information corresponding to the associated word "wudongqiankun" in Chinese includes the text information "wudongqiankun" and attribute information of the text information including "mianfei", "zhengben" and the jump address (e.g., an address linked to a reading button). The displaying template for the matching word information may be obtained according to a template attribute value "mianfei", "zhengben" in the attribute information. Content of the displaying template includes a field, e.g., "mianfei", "zhengben", or a combination of fields. According to various embodiments, the content of the displaying template for the matching word information may at least include fields "mianfei" and "zhengben".

According to various embodiments, one or more pieces of matching word information are preset and saved in a database in the index server 50. Each piece of the matching word information includes text information used to perform text matching with the associated word and attribute information of the text information. According to various embodiments, when the stored text information is the same as the associated word, a system may obtain the stored text information and the attribute information of the text information. According to various embodiments, the attribute information includes type information (e.g., a template attribute value) and jump address information.

According to various embodiments of the present disclosure, processes of generating the associated word list and generating the associated word information through searching are implemented in the background server 30 (e.g., a cloud server). Moreover, the above processes may also be implemented in the local client 10. A searching logic of obtaining the associated word information and a list generating logic of generating the associated word list is in the local client 10. Thus, in the system, the processes of generating the associated word list and obtaining the associated word information through searching are not limited to be implemented in the client 10 or the cloud server.

FIG. 5 is a diagram illustrating a system for obtaining associated word information according to various embodiments of the present disclosure. As shown in FIG. 5, the system further includes an index server 50 on the basis of the system provided according to various embodiments of the present disclosure.

The index server 50 establishes a communication relationship with a background server 30 (e.g., a cloud terminal at a background). The index server 50 performs a matching operation according to a searching keyword forwarded by the background server 30, obtains an index word list corresponding to the searching keyword, and transmits the index word list to the background server 30. The index word list includes one or more index words including the searching keyword and attribute information of the one or more index words. The background server 30 further matches each associated word in the associated word list with the one or more index words in the index word list to obtain matching word information corresponding to the associated word. The matching word information includes text information and attribute information of the text information, wherein the text information may be the associated word including an index word. According to various embodiments, the index server 50 obtains an index word list corresponding to the searching keyword, wherein the index word list comprises one or more index words respectively containing the searching keyword and attribute information respectively corresponding to the one or more index words.

According to various embodiments, the background server 30 searches for an index word contained in the associated word in the index word list, configures the text information of the matching word information with the associated word, configuring, by the server, the attribute information of the matching word information with the attribute information corresponding to the index word contained in the associated word when the index word contained in the associated word is searched out.

A search keyword "wudong" in Chinese, an associated word list including an associated word "wudongqiankunmianfei" in Chinese, an index word list including index words "wudong1", "wudong23", "23wudong1" and "wudongqiankun" in Chinese, and matching word information including text information "wudongqiankun mianfanzhengbenzaixianyuedu" in Chinese and a jump address of the text information are taken as an example to describe various embodiments.

Figure 6:
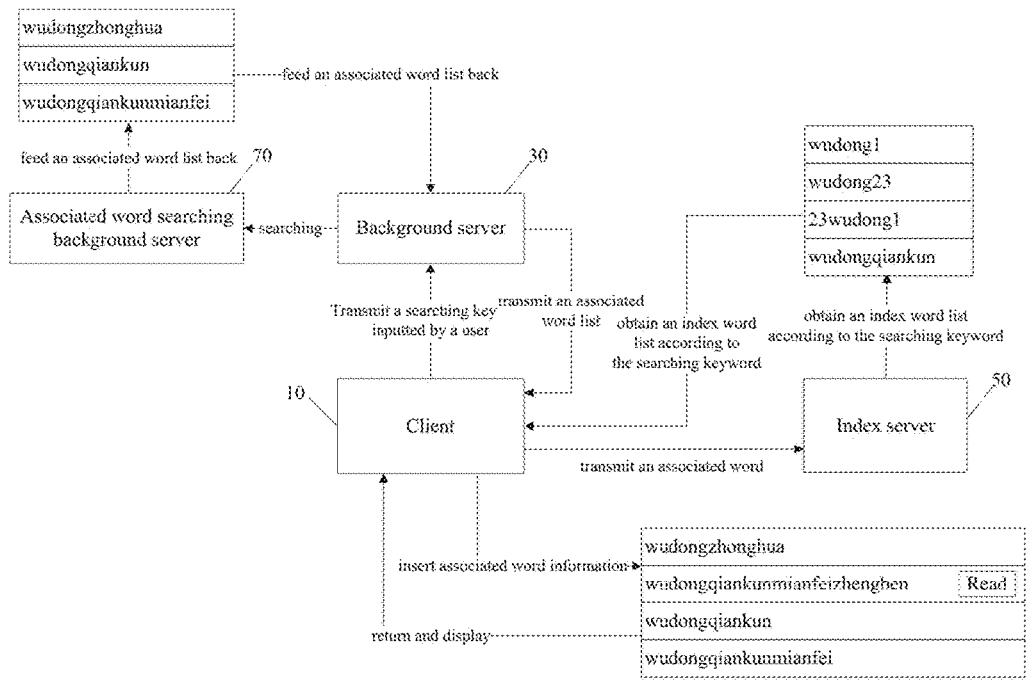
FIG. 6 is a diagram illustrating a structure of a system for obtaining associated word information according to various embodiments.

In various embodiments, a user inputs a searching keyword "wudong" in Chinese through a searching engine window provided in a client 10. The client 10 transmits a searching request carrying the searching keyword to a background 30. After receiving the searching request, the background 30 obtains an associated word list corresponding to the searching keyword "wudong" by performing a searching operation through accessing a searching engine interface of a background server of searching associated word 70 (e.g., a server provided by Baidu, or Sousou). The associated word list includes one or more associated words corresponding to the searching keyword, e.g., "wudongzhonghua", "wudongqiankunmianfei", "wudongqiji", "wudongliliang" as shown in FIG. 6. An associated word searching background server 70 transmits the associated word list obtained to the background server 30.

During the process of obtaining the associated word list, the background server 30 forwards the searching keyword transmitted from the client 10 to the index server 50 via a resource port in the index server 50. The index server 50 may compare the searching keyword with information in the database to determine whether the database in the index server 50 include the index word list matching with the searching keyword. The index word list matching with the searching keyword includes one or more index words including the searching keyword and attribute information respectively corresponding to the one or more index words. When there is the index word list matching with the searching keyword, the index word list matching the searching keyword is transmitted to the background server 30. For example, after transmitting the searching request carrying the searching keyword "wudong" to the background server 30, the background server 30 transmits the searching keyword "wudong" to the resource port. The index server 50 searches out one or more index words including the searching keyword "wudong", e.g., "wudong1", "wudong23", "23wudong1", "wudongqiankun" to determine content and a range of the index list corresponding to the searching keyword. The index server 50 may transmit index word information in the index list to the background server 30, wherein the index information includes the text information that is the same as the index word, e.g., "wudongqiankun", and the attribute information related with the text information e.g., type information of the text information and a jump address corresponding to the text information, wherein the type information of the text information may be one or more template attribute values used to obtain a displaying template. According to various embodiments, content of the displaying template corresponding to the one or more template attribute values may be any one or combination of "mianfei", "zhengben" and "zaixianyuedu" in Chinese.

The background server 30 obtains the associated word list and the index word list at the same time or successively. The background server 30 may match the information in the associated word list with the information in the index word list. The background server 30 transmits text information of an index word and attribute information of the text information as matching word information to the client 10 to be displayed when it is determined that an associated word in the associated word list contains the text information corresponding to the index word in the index word list. For example, since the associated word "wudongqiankunmianfei" in Chinese contains the text information "wudongqiankun" in Chinese in the index word list, the text information "wudongqiankunmianfei" and the attribute information corresponding to the "wudongqiankunmianfei" in the index word list is taken as the matching word information to be displayed in the client 10, wherein in the example, the attribute information corresponding to the "wudongqiankunmianfei" includes the type information (i.e., the template attribute value used to obtain the corresponding displaying template), e.g., "zhengben", "zaixianyuedu" and the jump address (i.e., a linking address). The text information in the matching word information is inserted into the displaying template.

FIG. 6 is a diagram illustrating a system for obtaining associated word information according to various embodiments of the present disclosure. As shown in FIG. 6, the system further includes an index server 50 on the basis of the system provided according to various embodiments of the present disclosure. The index server 50 has established a communication relationship with a client 10. The index server 50 performs a matching operation according to a searching keyword forwarded by the client 10, obtains an index word list corresponding to the searching keyword, and transmits the index word list back to the client 10. The index word list includes one or more index words containing the searching keyword and attribute information corresponding to the one or more index words. The client 10 further matches each associated word in the associated word list with the one or more index words in the index word list to obtain matching word information corresponding to the associated word. The matched word information includes text information and attribute information of the text information. The text information includes the associated word including an index word. According to various embodiments, the index server 50 obtains an index word list corresponding to the searching keyword, wherein the index word list comprises one or more index words respectively containing the searching keyword and attribute information respectively corresponding to the one or more index words.

According to various embodiments, the background server 30 searches for an index word contained in the associated word in the index word list, configures the text information of the matching word information with the associated word, configuring, by the server, the attribute information of the matching word information with the attribute information corresponding to the index word contained in the associated word when the index word contained in the associated word is searched out.

A search keyword "wudong" in Chinese, an associated word list including an associated word "wudongqiankunmianfei" in Chinese, an index word list including index words "wudong1", "wudong23", "23wudong1" and "wudongqiankun" in Chinese and matching word information including text information "wudongqiankunmianfanzhengbenzaixianyuedu" in Chinese, and a jump address of the text information are taken as an example to describe the varous embodiments In various embodiments, a user inputs a searching keyword "wudong" in Chinese through a searching engine window provided in a client 10. The client 10 transmits a searching request carrying the searching keyword to a background 30. After receiving the searching request, the background 30 obtains an associated word list corresponding to the searching keyword "wudong" by performing a searching operation through accessing a searching engine interface of a background server of searching associated word 70 (e.g., a server provided by Baidu, or Sousou). The associated word list includes one or more associated words corresponding to the searching keyword, e.g., "wudongzhonghua", "wudongqiankunmianfei", "wudongqiji", "wudongliliang" as shown in FIG. 6. An associated word searching background server 70 transmits the associated word list obtained to the background server 30. The background server 30 forwards the associated word list to the client 10.

During the process of obtaining the associated word list and forwarding the associated word list to the client 10, the client 10 forwards the searching keyword transmitted to the index server 50 via a resource port in the index server 50. The index server 50 may compare the searching keyword with information in the database to determine whether the database in the index server 50 includes the index word list matching with the searching keyword. The index word list matching with the searching keyword includes one or more index words including the searching keyword and attribute information respectively corresponding to the one or more index words. When there is the index word list matching with the searching keyword, the index word list matching the searching keyword is transmitted to the client 10. For example, after transmitting the searching request carrying the searching keyword "wudong" to the background server 30, the background server 30 transmits the searching keyword "wudong" to the resource port. The index server 50 searches out one or more index words including the searching keyword "wudong", e.g., "wudong1", "wudong23", "23wudong1", "wudongqiankun" to determine content and a range of the index list corresponding to the searching keyword. The index server 50 may be to transmit index word information in the index list to the client 10, wherein the index information includes the text information same as the index word, e.g., "wudongqiankun", and the attribute information related with the text information e.g., type information of the text information and a jump address corresponding to the text information, wherein the type information of the text information may be one or more template attribute values used to obtain a displaying template. According to various embodiments, content of the displaying template corresponding to the one or more template attribute values may be any one or combination of "mianfei", "zhengben" and "zaixianyuedu" in Chinese.

The client 10 obtains the associated word list and the index word list at the same time or successively. The client 10 may match the information in the associated word list with the information in the index word list. The background server 30 transmits text information of an index word and attribute information of the text information as matching word information to the client 10 to be displayed when it is determined that an associated word in the associated word list contains the text information corresponding to the index word in the index word list. For example, since the associated word "wudongqiankunmianfei" in Chinese contains the text information "wudongqiankun" in Chinese in the index word list, the text information "wudongqiankunmianfei" and the attribute information corresponding to the "wudongqiankunmianfei" in the index word list is taken as the matching word information to be displayed in the client 10, wherein in the example, the attribute information corresponding to the "wudongqiankunmianfei" includes the type information (i.e., the template attribute value used to obtain the corresponding displaying template), e.g., "zhengben", "zaixianyuedu" and the jump address (i.e., a linking address). The text information is inserted into the displaying template.

In addition, the index word in the index word list is included in one or more associated words in the associated word list. For example, when the index word is "wudongqiankun" in Chinese and the associated words returned by the searching engine are "wudongqiankun1", "wudongqiankun2" and "wudongqiankun3" in Chinese, the text information corresponding to the index word is inserted in front of positions of all associated words including "wudongqiankun" to be displayed, i.e., the text information is displayed in front of all associated words including "wudongqiankun" in the associated word area. If the searching keyword input by the user is the same as an index word in the index word list, the matching word information corresponding to the index word is displayed on top of the associated word area. During a matching process, an uppercase letter, a lowercase letter, and a number are supported. For example, the associated word "shoujiqq" may match with the index word "shoujiQQ".

According to various embodiments, one or more pieces of matching word information are preset and saved in a database in the index server 50. Each piece of the matching word information includes an index word (i.e., text information same as the index word) and attribute information corresponding to the index word. The text information is information matching with the associated word. A system may obtain one or more index words including the searching keyword and attributes information respectively corresponding to the one or more index words. According to various embodiments, the attribute information includes type information and jump address information.

After generating the associated word information displayed in the associated word area, the client 10 or the background server 30 may be to store a relationship among the associated word, the matching word information matching with the associated word and the associated word information obtained via the matching word information. Moreover, an associated word may be displayed in a position neighbor with a position where associated word information that has a relationship with the associated word is displayed in the associated word area.

According to various embodiments of the present disclosure, the process of generating the associated word list is implemented in the background server 30 (e.g., a cloud server). Moreover, the above process may also be implemented in the local client 10. A searching logic of obtaining the associated word information and a list generating logic of generating the associated word list is in the local client 10. Thus, in the system, the process of generating the associated word list is not limited to be implemented in the client 10 or the cloud server.

According to various embodiments, an accurate matching is performed, or a fuzzy matching is performed. That is, both the accurate matching and the fuzzy matching may apply to the matching process in the cloud server and the client 10.

According to various embodiments respectively as shown in FIG. 1-FIG. 6, the client 10 obtains a displaying template corresponding to matching word information and generates associated word information displayed in an associated word area through combining the matching word information with the displaying template. The client 10 obtains text information and attribute information in the matching word information, wherein the attribute information may include a template attribute value and a jump address. Afterwards, the client 10 inserts the text information into the displaying template (the text information is inserted in front of information of the displaying template) after obtaining the displaying template corresponding to the template attribute value to obtain displaying text, and combines the displaying text with the jump address to generate associated word information. After generating the associated word information, the client 10 inserts the associated word information into a preset position in the associated word area when various associated words in the associated word list are displayed in the associated word area. According to various embodiments, the client 10 matches the matching word information with pre-configured displaying templates after the matching word information matching with an associated word is obtained to select a displaying template, combines the matching word information and information in the displaying template to generate the associated word information, and displays the associated word information in a position in the associated word area, wherein the position may be a position on the top of the associated word area or a position in front of the associated word corresponding to the associated word information in the associated word area. According to various embodiments, a relationship among an associated word, matching word information matching with the associated word and associated word information obtained via the matching word information is stored.

According to various embodiments, the matching word information corresponding to an associated word "wudongqiankun" may include text information containing "wudongqiankun" and attribute information of the text information. A displaying template corresponding to the matching word information is searched out through a template attribute value in the attribute information. According to various embodiments, the template attribute value may be such as "0", "1", "2" and so on, or combination of various template attribute values. According to the template, attribute value may be used to search out the displaying template. Content of the displaying template may be a field, e.g. "mianfei", "zhengben" in Chinese, or combination of fields. For example, if "0" may be a field "mianfei", "1" may be a field "zhengben", the combination of "0" and "1" (i.e., "01") may be fields "mianfeizhengben" in Chinese. In addition, the attribute information may further include a jump address corresponding to the text information. After searching out the displaying template, the system may insert the text information into the displaying template. For example, "wudongqiankun" is added in front of "mianfeizhengben" to obtain displaying text "wudongqiankunmianfeizhengben" to be displayed in the direct area. The associated word information to be displayed is obtained by combining the displaying text and the jump address so as to provide accurate information to be accessed for the user in the associated word area.

According to various embodiments, the client 10 further inserts the associated word information into a position in the associated word area and displays each associated word and the associated word information corresponding to the associated word in the associated word area. According to various embodiments, the associated word information including displaying text "wudongqiankunmianfeizhengben" and a jump address corresponding to the displaying text is displayed in front of the associated word corresponding to the associated word information "wudongqiankun". According to various embodiments, the associated word information including the displaying text "wudongqiankunmianfeizhengbenzaixianyuedu" and a jump address corresponding to the displaying text is displayed in front of the associated word corresponding to the associated word information "wudongqiankunmianfei". That is, the direct area corresponding to the associated word is displayed in front of a position of the associated word and is close to the position of the associated word.

Figure 2B:
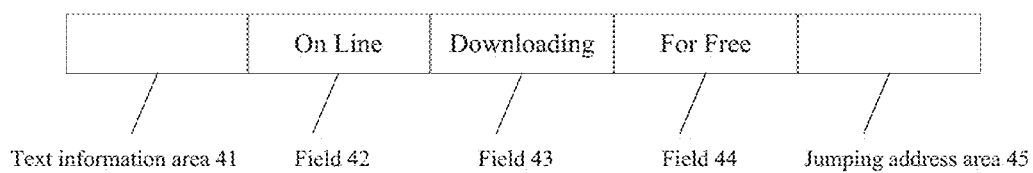
FIG. 2B is a diagram illustrating a displaying template according to various embodiments.

According to various embodiments, the matching word information corresponding to the associated word may include text information that is the same as the associated word and attribute information including one or more template attribute values and a jump address. FIG. 2B is a diagram illustrating a structure of a displaying template. The displaying template includes a text information area, one or more fields, and a jumping address area. In the example as shown in FIG. 2B the displaying template includes the text information area 41, one or more fields 42-44, and the jumping address area 45. When the one or more fields of the displaying template include one or more template attribute values in the matching word information, the displaying template corresponding to the matching word information is obtained. Moreover, the text information of the matching word information is added into the text adding area of the displaying template. Thus, the displaying text in the associated word information is generated, which includes the text information added into the text adding area and the text in the one or more field. Moreover, the jumping address in the matching word information may be added into the jumping address area in the displaying area.

According to various embodiments, the text information is added in front of field text of the displaying template to generating the displaying text. The jump address in the associated word information is configured with the jump address in the text information. According to various embodiments, the displaying template includes field text corresponding to one or more fields. For example, as shown in FIG. 2B, the field text corresponding to field 42 is "on line", the field text corresponding to field 43 is "downloading", and the field text corresponding to field 44 is "for free". The field text corresponding to the fields 42-44 is "on line downloading for free". If the text information of the matching word information is "wudongqiankun", the generated displaying text is "wudongqiankunonlinedownloadingforfree".

According to various embodiments, processes may be implemented by a computing device such as a personal computer, a server, a multiprocessor system, a microprocessor-based system, a distributed minicomputer, or a mainframe computer.

Figure 7:
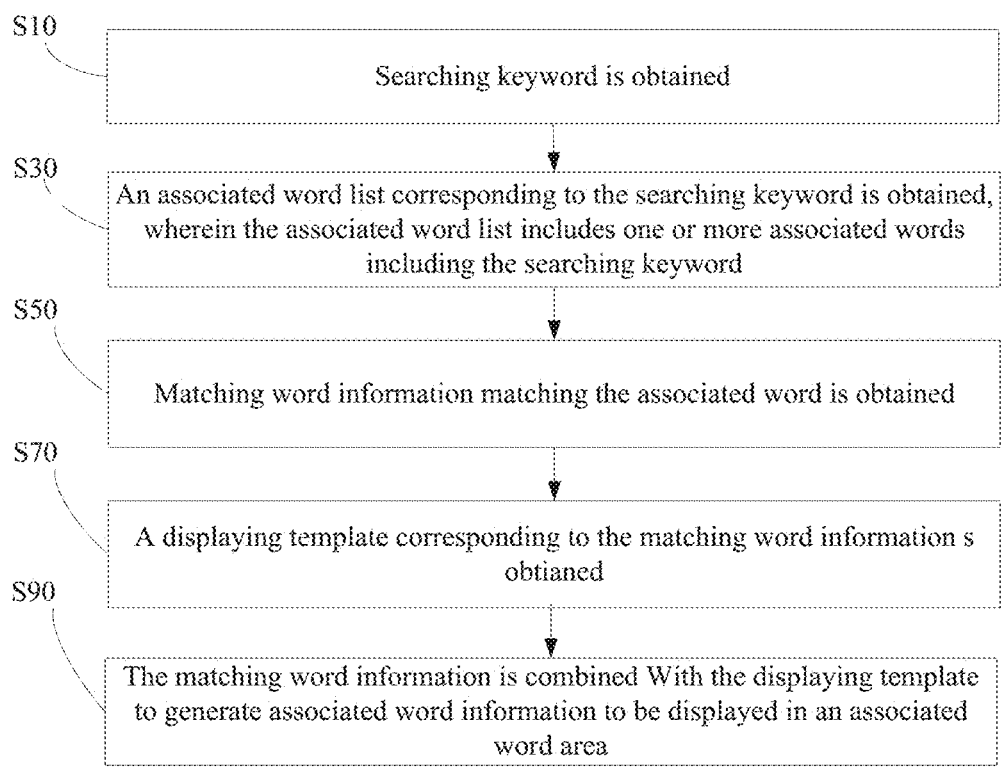
FIG. 7 is a flowchart illustrating a method for obtaining associated word information according to various embodiments.

FIG. 7 is a flowchart illustrating a method for obtaining associated word information. As shown in FIG. 7, the method includes the following procedures.

Block S10: A background server 30 as shown in FIG. 1 obtains a searching keyword.

Block S30: The background server 30 as shown in FIG. 1 obtains an associated word list corresponding to the searching keyword, wherein the associated word list includes one or more associated words including the searching keyword.

Block S50: For each associated word in the associated word list, the background server 30 as shown in FIG. 3 obtains matching word information matching the associated word, wherein the matching word information at least includes the associated words. According to various embodiments, the matching word information includes text information that is the same as the associated word list and the attribute information.

Block S70: The background server 30 as shown in FIG. 1 obtains a displaying template corresponding to the matching word information.

Block S90: For each associated word in the associated word list, the background server as shown in FIG. 1 combines the matching word information with the displaying template to generate associated word information to be displayed in an associated word area. According to various embodiments, the associated word information may include a displayed text and a jump address corresponding to the displayed text.

According to various embodiments, on the basis of obtaining the one or more associated words which correspond to the searching keyword and are displayed in the associated word area, for each associated word in the one or more associated words, the matching word information corresponding to the associated word is obtained to generate the displaying text and the jump address (i.e., a linking address) displayed in the associated word area. Thus, a user does not need to first select an associated word and then obtain a linking address (i.e. a jump address) to be accessed accurately. According to the technical method according to various embodiments, the user can directly obtain the information and the linking address corresponding to the information to be accessed. Thus, a system for obtaining associated information (e.g., accurate information and a linking address) is provided by searching the associated word so as to improve accuracy for obtaining searching results and improve searching efficiency.

A method provided may apply to a system provided according to various embodiments. According to various embodiments, an index word list is obtained through preset association relationships of an associated word and matching word information. The index list includes an associated word and one or more pieces of matching word information corresponding to the associated word. The matching word information includes text information and information of a jump address displayed in the associated word area. After a piece of the matching word information is added into a corresponding displaying template, precise searching information may be obtained in the associated word area by the user, so as to improve user's searching efficiency. After the associated word is obtained, the user can click a linking address (e.g. URL) in text information displayed in a drop-down list in the associated word area. Afterwards, a corresponding website is jumped to.

According to various embodiments, the process of obtaining the matching information matching with the associated word may include obtaining the associated word in the associated word list, transmitting the associated word to an index server 50, and receiving a searching resulted by the index server 50 according to the associated word, wherein the searching result may be matching word information that corresponds to the associated word and is obtained by searching and the matching word information includes text information that is the same as the associated word and the attribute information. The method according to the various embodiments may be implemented in the background server 30 or a client 10 and may include matching the associated word in the searching server to obtain accurate matching information to be displayed in the client 10 after an associated word searching background server 70 searches out the associated word. The method according to various embodiments is a method for an accurate matching operation and may apply to a system provided according to various embodiments as shown in FIG. 3 and FIG. 4.

According to various embodiments, the process of obtaining the matching information matching with the associated word may include obtaining the associated word in the associated word list, receiving an index word list that corresponds to the searching keyword and is obtained by a matching operation in the index server 50, wherein the index word list includes one or more index words containing the searching word and attribute information respectively corresponding to the index word, matching the associated word and the one or more index words to obtain the matching word information, wherein the matching word information includes text information and attribute information, wherein the text information may be an associated word containing the index word. The method according to the various embodiments is a method for a fuzzy matching operation, and may apply to a system provided according to various embodiments as shown in FIG. 5 and FIG. 6.

According to various embodiments, an index word list corresponding to the searching keyword is obtained, wherein the index word list includes one or more index words respectively containing the searching keyword and attribute information respectively corresponding to the one or more index words. The index word contained in the associated word in the index word list is searched for. The text information of the matching word information is configured with the associated word and the attribute information of the matching word information is configured with the attribute information corresponding to the index word when the index word contained in the associated word is searched out.

According to various embodiments, the associated word may include a displaying text and a jump address (e.g., a linking address) corresponding to the displaying text, and the process of obtaining the displaying template corresponding to the matching word information and combining the associated word information with the displaying template to generate the associated word information to be displayed in the associated word area includes the following procedures: obtain the text information and the attribute information corresponding to the text information of the matching word information, wherein the matching word information may include a template attribute value and a jump address, searching out the displaying template corresponding to the template attribute value, inserting the text information into the displaying template, and combining the displaying text with the jumping address to generate the associated word information after the displaying text is obtained.

According to various embodiments, a displaying template satisfying that field text in the displaying template contains a text corresponding to the template attribute value that is searched for. The displaying template corresponding to the matching word information is configured with the searched out displaying template when the displaying template satisfying that field text in the displaying template contains a text corresponding to the template attribute value that is searched out.

The process of obtaining the displaying template corresponding to the matching word information is implemented by the client 10 and the background server 30 provided by the system as shown in FIG. 3-FIG. 7. According to attribute information in the associated word information, a displaying template having the same content or the same the same identifier as the template attribute value is searched out as the displaying template corresponding to the associated word information. The text information is inserted in front of a position of the text in the displaying template to obtain the display text. The displaying text is combined with the jump address to obtain the associated word information to be displayed in the associated word area. The client 10 or the background server 30 may pre-store multiple displaying templates for searching.

According to various embodiments, the text information is added in front of the field text of the displaying template to generate the displaying text. The jump address in the associated word information is configured with the jump address in the text information. According to various embodiments, the displaying template includes field text corresponding to one or more fields. For example, as shown in FIG. 2B, the field text corresponding to field 42 is "on line", the field text corresponding to field 43 is "downloading", and the field text corresponding to field 44 is "for free". The field text corresponding to the fields 42-44 is "on line downloading for free". If the text information of the matching word information is "wudongqiankun", the generated displaying text is "wudongqiankunonlinedownloadingfor-free".

The method according to various embodiments may apply to a system according to various embodiments respectively as shown in FIG. 3-FIG. 4. According to various embodiments, the matching word information corresponding to an associated word "wudongqiankun" may include text information containing "wudongqiankun" and attribute information of the text information. A displaying template corresponding to the matching word information is searched out through a template attribute value in the attribute information. According to various embodiments, the template attribute value may be such as "0", "1", "2" and so on, or combination of various template attribute values. According to the template, attribute value may be used to search out the displaying template. Content of the displaying template may be a field, e.g. "mianfei", "zhengben" in Chinese, or combination of fields. For example, if "0" may be a field "mianfei", "1" may be a field "zhengben", the combination of "0" and "1" (i.e., "01") may be fields "mianfeizhengben" in Chinese. In addition, the attribute information may further include a jump address corresponding to the text information. After searching out the displaying template, the system may insert the text information into the displaying template. For example, "wudongqiankun" is added in front of "mianfeizhengben" to obtain displaying text "wudongqiankunmianfeizhengben" to be displayed in the direct area in the associated word area. The associated word information to be displayed is obtained by combining the displaying text and the jump address so as to provide accurate information to be accessed for the user in the associated word area.

According to various embodiments, after generating the associated word information in the associated word area, the method further comprises: inserting the associated word information into a preset position in the associated word area. A different associated word area is generated, which may display an associated word list and associated word information, and thus has a function of directly jumping to an interesting webpage. The preset position in the example may be a position on the top of the associated area or a position in front of the position of the associated word corresponding to the associated word information and close to the position of the associated word corresponding to the associated word information. After displaying the associated word and the associated word information in the associated word area, the method further includes saving a relationship among the associated word, the matching word information corresponding to the associated word, and the associated word information corresponding to the associated word. That is, a relationship among the associated word, the matching word information corresponding to the associated word, and the associated word information corresponding to the associated word has been saved.

According to various embodiments, the client 10 adds the associated word information into a preset position in an associated word area, wherein the preset position comprises any one of the following positions: a position on the top of the associated word area, a position in front of a position of the associated word and close to the position of the associated word, and a position behind a position of the associated word and close to the position of the associated word.

The blocks as shown in FIG. 7 may be implemented by a computing device. Moreover, although a logical order is illustrated in FIG. 7, in some conditions, the blocks may be performed not according to the order illustrated in FIG. 7.

The computing device for implementing the blocks in the method may be that such as a personal computer, a server, a multiprocessor system, a microprocessor-based system, a distributed minicomputer, or a mainframe computer. Moreover, all of the blocks in the method may be implemented in one computing device by multiple computing devices through data transmission among the multiple devices.

Figure 8:
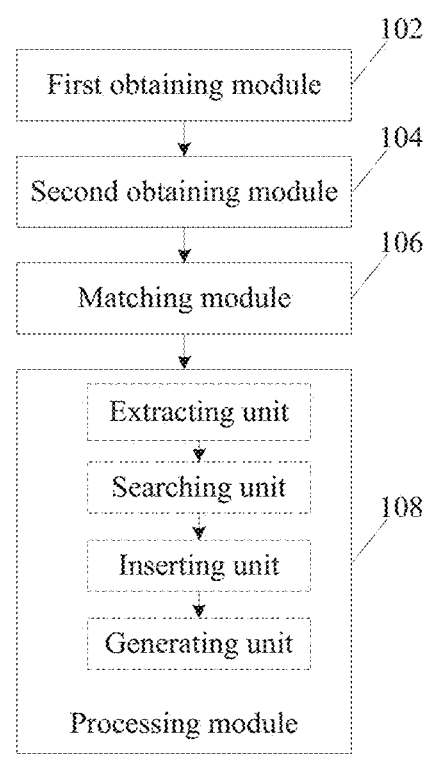
FIG. 8 is a diagram illustrating a structure of an apparatus for obtaining associated word information according to various embodiments.

FIG. 8 is a diagram illustrating a structure of an apparatus for obtaining associated word information according to various embodiments of the present disclosure. The apparatus includes: a first obtaining module 102, a second obtaining module 104, a matching module 106, and a processing module 108.

The first obtaining module 102 obtains a searching keyword. The second obtaining module 104 obtains an associated word list corresponding to the searching keyword and the associated word list includes one or more associated words respectively containing the searching keyword. For each associated word in the associated word list, the matching module 106 obtains matching word information corresponding to the associated word list according to the associated word, wherein the matching word information at least includes the associated word. For each associated word in the associated word list, the processing module 108 obtains a displaying template corresponding to the matching word information and combines the matching word information with the displaying template to generate associated word information, wherein the associated word information includes a displaying text and a jump address.

According to various embodiments, on the basis of obtaining the one or more associated words which correspond to the searching keyword and are displayed in the associated word area implemented by the first obtaining module 102 and the second obtaining module 104, for each associated word in the one or more associated word, the matching module 106 further obtains the matching word information corresponding to the associated word to generate the displaying text and the jump address (i.e., a linking address) displayed in the associated word area. Thus, a user does not need to first select an associated word and then obtain a linking address (i.e. a jump address) to be accessed accurately. According to the technical method according to various embodiments, the user can directly obtain the information and the linking address corresponding to the information to be accessed. Thus, a system for obtaining associated information (e.g., accurate information and a linking address) is provided by searching the associated word so as to improve accuracy for obtaining searching result and improve searching efficiency.

According to various embodiments, the matching module 106 may include a first reading unit, a forwarding unit, and a first receiving unit. The first reading unit obtains one or more associated words in the associated word list. The forwarding unit transmits the one or more associated words to an index server 50. For each associated word, the first receiving unit receives a searching result returned from the index server 50, the search result may be the matching word information corresponding to the associated word obtained through searching in the index server 50, wherein the matching word information includes text information same as the associated word and attribute information corresponding to the text information.

According to various embodiments, the matching module 106 may include a second reading unit or a second receiving unit. The second reading unit obtains one or more associated words in the associated word list. The second receiving unit receives an index word list corresponding to the searching word and obtained through a matching operation in the index word list, the index word list includes one or more index words containing the searching keyword, and attribute information respectively corresponding to the one or more index words. For each associated word, the matching processing module 108 matches the associated word with the one or more index words to obtain the matching word information, wherein the matching word information includes the text information and the attribute information, wherein the text information is the associated word containing the index word.

According to various embodiments, the matching module 106 searches for matching information the text information of that is same as the associated word, configure the matching information corresponding to the associated word with the matching information the text information of that is same as the associated word.

According to various embodiments, the matching module obtains an index word list corresponding to the searching keyword, wherein the index word list includes one or more index words respectively containing the searching keyword and attribute information respectively corresponding to the one or more index words, searches for an index word contained in the associated word in the index word list, configures the text information of the matching word information with the associated word, and configures the attribute information of the matching word information with the attribute information corresponding to the index word when the index word contained in the associated word is searched out.

According to various embodiments, the associated word information includes a displaying text and a jump address. The processing module 108 may include an extracting unit, a searching unit, an inserting unit, and a generating unit. The extracting unit obtains the text information and the attribute information in the matching word information, wherein the attribute information includes a template attribute value and a jump address. The searching unit searches out the displaying template corresponding to the template attribute value. The inserting unit inserts the text information into the displaying template to generate the displaying text. The generating module combines the displaying text with the jump address to generate the associated word information.

According to various embodiments, the attribute information in the matching word information includes a template attribute value and a jump address, the associated word information includes a displaying text and a linking address, and the processing module includes a searching unit, to search for a displaying template satisfying that field text in the displaying template contains a text corresponding to the template attribute value, and configures the displaying template corresponding to the matching word information with the searched out displaying template when the displaying template satisfying that field text in the displaying template contains a text corresponding to the template attribute value is searched out;

The technical method according to various embodiments of the present disclosure can address the technical challenges that searching efficiency is low since only the associated word for the searching keyword is provided for the user and the information for the user is limited during a searching process. The technical method according to various embodiments of the present disclosure can improve searching accuracy and searching efficiency.

Those skilled in the art will recognize that various modules and various blocks can be implemented by a general computing device. The various modules and various blocks can be concentrated on a single computing device or can be distributed on a network including multiple computing devices. The various modules and various may be executed through instructions stored in the memory in the computing device. Thus, the instructions can be stored in the memory and be executed by a processor. Alternatively, the various modules and various blocks can be respectively made into various integrated circuit modules. Alternatively, some modules or blocks can be made into a single circuit module, which is not limited in the present disclosure.

The methods and modules or units described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by single purpose hardware, such as custom integrated circuits, gate array, FPGA, PLD and single purpose computers and so on.

Figure 9:
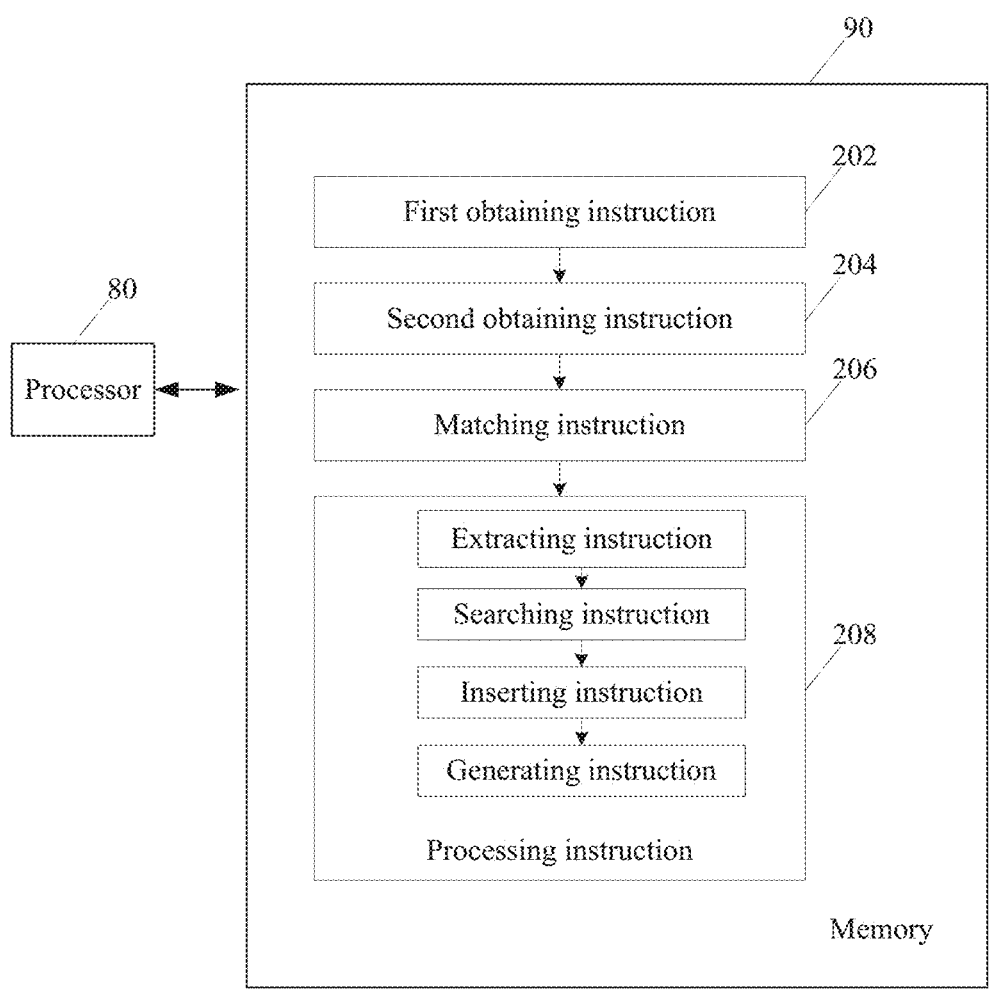
FIG. 9 is a diagram illustrating a structure of an apparatus for obtaining associated word information according to various embodiments.

FIG. 9 is a diagram illustrating a structure of an apparatus for obtaining associated word information according to various embodiments of the present disclosure. The apparatus includes a processor 80 for executing instructions stored in a memory 90. The instructions include a first obtaining instruction 202, a second obtaining instruction 204, a matching instruction 206, and a processing instruction 208.

The first obtaining instruction 202 obtains a searching keyword. The second obtaining instruction 204 obtains an associated word list corresponding to the searching keyword, the associated word list includes one or more associated words respectively containing the searching keyword. For each associated word in the associated word list, the matching instruction 206 obtains matching word information corresponding to the associated word list according to the associated word, wherein the matching word information at least includes the associated word. For each associated word in the associated word list, the processing instruction 208 obtains a displaying template corresponding to the matching word information and combines the matching word information with the displaying template to generate associated word information, wherein the associated word information includes a displaying text and a jump address.

According to various embodiments, on the basis of obtaining the one or more associated words which correspond to the searching keyword and are displayed in the associated word area implemented by the first obtaining instruction 202 and the second obtaining instruction 204, for each associated word in the one or more associated word, the matching instruction 206 further obtains the matching word information corresponding to the associated word to generate the displaying text and the jump address (i.e., a linking address) displayed in the associated word area. Thus, users need not to first select an associated word and then obtain a linking address (i.e. a jump address) to be accessed accurately. According to the technical method in the example, the user can directly obtain the information and the linking address corresponding to the information to be accessed. Thus, a system for obtaining associated information (e.g., accurate information and a linking address) is provided by searching the associated word so as to improve accuracy for obtaining searching result and improve searching efficiency.

According to various embodiments, the matching instruction 206 may include a first reading instruction, a forwarding instruction, or a first receiving instruction. The first reading instruction obtains one or more associated words in the associated word list. The forwarding instruction transmits the one or more associated words to an index server 50. For each associated word, the first receiving instruction receive a searching result returned from the index server 50, the search result may be the matching word information corresponding to the associated word obtained through searching in the index server 50, wherein the matching word information includes text information same as the associated word and attribute information corresponding to the text information.

According to various embodiments, the matching instruction 206 may include a second reading instruction and a second receiving instruction. The second reading instruction obtains one or more associated words in the associated word list. The second receiving instruction receives an index word list corresponding to the searching word and obtained through a matching operation in the index word list, the index word list includes one or more index words containing the searching keyword, and attribute information respectively corresponding to the one or more index words. For each associated word, the matching processing instruction 208 matches the associated word with the one or more index word to obtain the matching word information, wherein the matching word information includes the text information and the attribute information, wherein the text information is the associated word containing the index word.

According to various embodiments, the matching instruction 206 searches for matching information the text information of that is same as the associated word, and configures the matching information corresponding to the associated word with the matching information the text information of that is same as the associated word.

According to various embodiments, the matching instruction obtains an index word list corresponding to the searching keyword, wherein the index word list includes one or more index words respectively containing the searching keyword and attribute information respectively corresponding to the one or more index words, searches for an index word contained in the associated word in the index word list, configures the text information of the matching word information with the associated word, and configures the attribute information of the matching word information with the attribute information corresponding to the index word when the index word contained in the associated word is searched out.

According to various embodiments, the associated word information includes a displaying text and a jump address. The processing instruction 208 may include an extracting instruction, searching instruction, an inserting instruction, and a generating instruction. The extracting instruction obtains the text information and the attribute information in the matching word information, wherein the attribute information includes a template attribute value and a jump address. The searching instruction searches out the displaying template corresponding to the template attribute value. The inserting instruction inserts the text information into the displaying template to generate the displaying text. The generating instruction combines the displaying text with the jump address to generate the associated word information.

According to various embodiments, the attribute information in the matching word information includes a template attribute value and a jump address, the associated word information includes a displaying text and a linking address, and the processing instruction includes a searching instruction, to search for a displaying template satisfying that field text in the displaying template contains a text corresponding to the template attribute value, configure the displaying template corresponding to the matching word information with the searched out displaying template when the displaying template satisfying that field text in the displaying template contains a text corresponding to the template attribute value is searched out;

The various embodiments of the present disclosure can address the technical issue that searching efficiency is low since information provided by the associated word for the searching keyword input by the user is limited during a searching process. The various embodiments of the present disclosure can improve searching accuracy and searching efficiency.

Those skilled in the art will recognize that various instructions and various blocks can be implemented by a general computing device. The various instructions and various blocks can be concentrated on a single computing device or can be distributed on a network including multiple computing devices. The various instructions may be executed through instructions stored in the memory in the computing device. Thus, the instructions can be stored in the memory and be executed by a processor. Alternatively, the various instructions and various blocks can be respectively made into various integrated circuit instructions. Alternatively, some instructions or blocks can be made into a single circuit instruction, which is not limited in the present disclosure.

The foregoing are examples of the present disclosure and are not used to limit the protection scope of the present disclosure. Any modification, equivalent substitution, and improvement without departing from the spirit and principle of the present disclosure are within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for obtaining associated information, comprising:
   obtaining, by a computing device acting as a server, a searching keyword;
   obtaining, by the computing device, an associated word list corresponding to the searching keyword, wherein the associated word list comprises one or more associated words containing the searching keyword;
   obtaining, by the computing device, matching word information corresponding to an associated word in the associated word list, wherein the matching word information comprises text information same as the associated word and attribute information, and the attribute information including a template attribute value of the associated word and a web address corresponding to the associated word;
   obtaining, by the computing device, a displaying template corresponding to the template attribute in the matching word information, the displaying template being composed of at least one field text describing the template attribute value of the associated word;
   generating, by the computing device, associated word information that includes a displaying text and a jump address corresponding to the displaying text, including: generating the displaying text by combining the associated word and the at least one field text from the displaying template; and obtaining the jump address based on the web address included in the attribute information;
   simultaneously displaying, by the computing device, in a candidate query interface configured to present candidate search queries obtained based on the associated word list, the associated word as a first query of the candidate search queries, the displaying text as a second query of the candidate search queries, and a direct-access button placed at a location corresponding to the second query; and
   triggering the computing device to directly open the website at the jump address when a user clicks the direct-access button,
   wherein: obtaining the displaying template corresponding to the matching word information comprises: searching for a displaying template satisfying that field text in the displaying template contains a text corresponding to the template attribute value; and configuring the displaying template corresponding to the matching word information with the searched out displaying template when the displaying template satisfies that field text in the displaying template contains a text corresponding to the template attribute value is searched out; and
   generating the associated word information comprises:
      adding the text information in front of the field text of the displaying template to generate the displaying text, and
      configuring the displaying text with the jump address to generate the associated word information.

2. The method according to claim 1, wherein obtaining matching word information corresponding to the associated word comprises:
   obtaining, by the computing device, an index word list corresponding to the searching keyword, wherein the index word list comprises one or more index words respectively containing the searching keyword and attribute information respectively corresponding to the one or more index words;
   searching, by the computing device, for an index word contained in the associated word in the index word list; and
   configuring, by the computing device, the text information of the matching word information with the associated word, configuring, by the computing device, the attribute information of the matching word information with the attribute information corresponding to the index word contained in the associated word when the index word contained in the associated word is searched out.

3. The method according to claim 1, further comprising:
   adding, by the computing device, the associated word information into a preset position in an associated word area of the candidate query interface,
   wherein the preset position comprises any one of the following positions: a position on the top of the associated word area, a position in front of a position of the associated word and close to the position of the associated word, a position behind a position of the associated word and close to the position of the associated word.

4. The method according to claim 1, further comprising: saving, by the computing device, a relationship among the associated word, the matching word information corresponding to the associated word and the associated word information corresponding to the associated word.

5. The method according to claim 1, wherein: a type of a function provided by the website at the jump address includes one of resource download, free content, and online reading.

6. An apparatus for obtaining associated word information, comprising:
  a processor for executing instructions stored in a memory, the instructions comprising:
  a obtaining instruction, to obtain a searching keyword;
  a second obtaining instruction, to obtain an associated word list corresponding to the searching keyword, wherein the associated word list comprises one or more associated words containing the searching keyword;
  a matching instruction, to obtain matching word information corresponding to an associated word in the associated word list, wherein the matching word information comprises text information same as the associated word and attribute information, and the attribute information including a template attribute value of the associated word and a web address corresponding to the associated word; and
  a processing instruction, to
    obtain a displaying template corresponding to the template attribute in the matching word information, the displaying template being composed of at least one field text describing the template attribute value of the associated word,
    generate associated word information that includes a displaying text and a jump address corresponding to the displaying text, including: generating the displaying text by combining the associated word and the at least one field text from the displaying template; and obtaining the jump address based on the web address included in the attribute information;
    simultaneously display, in a candidate query interface configured to present candidate search queries obtained based on the associated word list, the associated word as a first query of the candidate search queries, the displaying text as a second query of the candidate search queries, and a direct-access button placed at a location corresponding to the second query; and
    directly open the website at the jump address when a user clicks the direct-access button,
  wherein the processing instruction further comprises:
    a searching instruction, to search for a displaying template satisfying that field text in the displaying template contains a text corresponding to the template attribute value, configure the displaying template corresponding to the matching word information with the searched out displaying template when the displaying template satisfying that field text in the displaying template contains a text corresponding to the template attribute value is searched out; and
    a generating instruction, to add the text information in front of the field text of the displaying template to generate the displaying text, and to configure the displaying text with the jump address to generate the associated word information.

7. The apparatus according to claim 6, wherein the matching instruction searches for matching information the text information of that is same as the associated word, configure the matching information corresponding to the associated word with the matching information the text information of that is same as the associated word.

8. The apparatus according to claim 6, wherein the matching instruction obtains an index word list corresponding to the searching keyword, wherein the index word list comprises one or more index words respectively containing the searching keyword and attribute information respectively corresponding to the one or more index words, search for an index word contained in the associated word in the index word list, configure the text information of the matching word information with the associated word, configure the attribute information of the matching word information with the attribute information corresponding to the index word when the index word contained in the associated word is searched out.

9. A system for obtaining associated word information, comprising:
  a client including a processor for executing instructions stored in a non-transitory machine readable storage medium to transmit a searching request carrying a searching keyword; and
  a background server including a processor for executing instructions stored in a non-transitory machine readable storage medium to establish a communication relationship with the client, to:
  obtain a searching keyword,
  obtain an associated word list corresponding to the searching keyword, wherein the associated word list comprises one or more associated words containing the searching keyword,
  obtain matching word information corresponding to an associated word in the associated word list, wherein the matching word information comprises text information same as the associated word list and attribute information, and the attribute information including a template attribute value of the associated word and a web address corresponding to the associated word, obtain a displaying template corresponding to the template attribute in the matching word information, the displaying template being composed of at least one field text describing the template attribute value of the associated word,
  generate associated word information that comprises a displaying text and a jump address corresponding to the displaying text, including: generating the displaying text by combining the associated word and the at least one field text from the displaying template; and obtaining the jump address based on the web address included in the attribute information;
  wherein the client is further configured to simultaneously display, in a candidate query interface configured to present candidate search queries obtained based on the associated word list, the associated word as a first query of the candidate search queries, the displaying text as a second query of the candidate search queries, and a direct-access button placed at a location corresponding to the second query; and directly open the website at the jump address when a user clicks the direct-access button,
  wherein obtaining the displaying template corresponding to the matching word information comprises: searching for a displaying template satisfying that field text in the displaying template contains a text corresponding to the template attribute value; and configuring the displaying template corresponding to the matching word information with the searched out displaying template when the displaying template satisfies that field text in the displaying template contains a text corresponding to the template attribute value is searched out; and generating the associated word information comprises:
adding the text information in front of the field text of the displaying template to generate the displaying text, and configuring the displaying text with the jump address to generate the associated word information.

10. The system according to claim 9, further comprising:
an index server including a processor for executing instructions stored in a non-transitory machine readable storage medium to establish a communication relationship with the background server, to transmit the matching information the text information of that is same as the associated word to the background server when the matching information the text information of that is same as the associated word is searched out.

11. The system according to claim 9, further comprising:
an index server including a processor for executing instructions stored in a non-transitory machine readable storage medium to establish a communication relationship with the background server, to obtain an index word list corresponding to the searching keyword forwarded by the background server, wherein the index word list comprises one or more index words respectively containing the searching keyword and attribute information respectively corresponding to the one or more index words;

the background server further searches for an index word contained in the associated word in the index word list, configure the text information of the matching word information with the associated word, configure the attribute information of the matching word information with the attribute information corresponding to the index word when the index word contained in the associated word is searched out.

12. The system according to claim 9, the client further adds the associated word information into a preset position in an associated word area, wherein the preset position comprises any one of the following positions: a position on the top of the associated word area, a position in front of a position of the associated word and close to the position of the associated word, a position behind a position of the associated word and close to the position of the associated word.

* * * * *